(12) United States Patent
Wright (10) Patent No.: US 8,655,838 B2
(45) Date of Patent: Feb. 18, 2014

(54) SELECTION OF PEERS TO CLUSTER WITHIN A PEER-TO-PEER NETWORK

(75) Inventor: Steven Wright, Roswell, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 760 days.

(21) Appl. No.: 12/034,153

(22) Filed: Feb. 20, 2008

(65) Prior Publication Data
US 2009/0210545 A1 Aug. 20, 2009

(51) Int. Cl.
*G06F 17/00* (2006.01)

(52) U.S. Cl.
USPC ............................ 707/622; 707/227; 707/230

(58) Field of Classification Search
USPC ................................... 707/622; 709/227, 230
See application file for complete search history.

(56) References Cited

U.S. PATENT DOCUMENTS

| | | | |
|---|---|---|---|
| 6,415,280 B1 * | 7/2002 | Farber et al. ................... | 707/698 |
| 2003/0040316 A1 * | 2/2003 | Stanforth et al. .............. | 455/445 |
| 2004/0044790 A1 * | 3/2004 | Loach et al. ................... | 709/241 |
| 2006/0056336 A1 * | 3/2006 | Dacosta ......................... | 370/328 |
| 2007/0016939 A1 * | 1/2007 | Leibovitz et al. .............. | 726/3 |
| 2007/0174443 A1 | 7/2007 | Shaheen | |
| 2007/0291715 A1 * | 12/2007 | Laroia et al. ................... | 370/338 |
| 2008/0040606 A1 * | 2/2008 | Narayanan et al. ............ | 713/169 |

OTHER PUBLICATIONS

Srivatsa, M; Liu, L, Large Scaling Unstructued Peer-to-Peer Networks with Heterogeneity-Aware Topology and Routing, IEEE Trans. on Parallel and Distr. Sys., v17, Nov. 2006.
Huang, Y; Chen, Y; Jana, R; Jiang, H; Rabinovich, M; Reibman, A, Wei, B; Xiao, Z; Capacity Analysis of MediaGrid: . . . , IEEE Jnl on Selected Areas in Comm; v25, Jan. 2007.
Ramaswamy, L; Gedik, B; Liu, L; A Distributed Approach to Node Clustering in Decentralized Peer-to-Peer Networks, IEEE Trans on Parallel and Distr. Sys, v16, Sep. 2005.
Chen, Y; Huang, Y; Jana, R; Jiang, H, Rabinovich, M; Wei, B, Xiao, Z; When is P2P Technology Beneficial for IPTV Services?, NOSSDAV 2007.
Technical White Paper Smart Card in IMS; Gemalto, Feb. 2007.
http://en.wikipedia.org/wiki/IMSI, last updated Feb. 12, 2008.
http://en.wikipedia.org/wiki/MEID, last updated Dec. 8, 2007.
http://en.wikipedia.org/wiki/DOCSIS, last updated Feb. 4, 2008.

* cited by examiner

*Primary Examiner* — Jude Jean Gilles
*Assistant Examiner* — Jaren M Means
(74) *Attorney, Agent, or Firm* — Parks IP Law LLC; Jennifer P. Medlin, Esq.

(57) ABSTRACT

Peer-to-peer networks may be established by considering various characteristics of the peers when clustering the peers within the network. The characteristics may include operational criteria such as the cost of data transfer by each peer, the type and status of power being supplied to each peer, and the bandwidth available to each peer. The peer-to-peer networks may be established by requiring credentials to gain access to the peer-to-peer network, where those credentials may be a network access identifier that has previously been used to gain access to an underlying data network of the peer-to-peer network. The operational criteria used to select peers for clustering may be stored and accessed through association to the credentials used to gain access to the peer-to-peer network.

18 Claims, 6 Drawing Sheets

| | TYPE – PEER ID — 802 | COST CLASS — 804 | POWER CLASS — 806 | BANDWIDTH AVAILABLE — 808 | ALLOWABLE CONTENT CLASS — 809 | RESTRICTED GROUP — 811 |
|---|---|---|---|---|---|---|
| 810 — | SIM – 12345 | B | L | S | X | --- |
| 812 — | MAC – ABC123 | A | M | F | Y | V1 |
| 814 — | PPP – NAME/PASSWORD | A | L | F | Z | V3 |
| 816 — | SIM – 98765 | B | L | F | X | U1 |
| 818 — | MEID – 24680 | B | M | S | X | --- |
| | . . . | . . . | . . . | . . . | . . . | . . . |

FIG. 8

SELECTION OF PEERS TO CLUSTER WITHIN A PEER-TO-PEER NETWORK

TECHNICAL FIELD

Embodiments relate to peer-to-peer (P2P) networks. More particularly, embodiments relate to clustering of peers within a P2P network.

BACKGROUND

P2P networks are becoming commonplace as the demand for data transfer increases on underlying public and private data networks. P2P networks allow the data needed by one peer to be sourced from one of potentially many different peers, thereby preventing the original source from becoming overloaded with content requests. While P2P networks resolve some content delivery issues such as the overloading of the original source, P2P networks may suffer from other content delivery issues.

For example, a given peer may have a relatively low upload transfer rate. If that peer is called on to deliver content to too many other peers, the delivery of that content to those other peers may be delayed. As another example, a given peer may have a high cost of data transfer or a data transfer limit. If that peer is called on to deliver content to or receive content from too many other peers or to deliver content too often, the content delivery may result in increased network access charges to the owner of that peer or may even result in this peer going offline. As yet another example, a given peer may have a time or activity limited power source. If that peer is called on to deliver content to or receive content from too many other peers or to deliver content too often, the content delivery may result in this peer going offline or even shutting down altogether.

Other issues present in P2P networks include controlling access to the networks and having access to information about peers joined to the P2P networks. As P2P networks may operate with virtually anonymous peers, content control and peer selection is difficult. The virtually anonymous status of peers also makes any attempts to control and improve the operation of the P2P network difficult.

SUMMARY

Embodiments address issues such as these and others by considering characteristics such as operational criteria of peers during a query list peer selection process that defines a cluster for a given peer. Operational criteria such as cost of data transfer, power source type, and bandwidth availability of peers may be considered. The criteria may pertain to the peer being provided with a query list and/or to the peers being added to the query list. Furthermore, embodiments may utilize network access identifiers that are presented by peers when obtaining access to the underlying data networks to make determinations such as whether the peer has authorization to participate in the P2P network and/or to obtain the operational criteria for a given peer when building the query list.

Embodiments provide methods, computer readable media, and devices involved in providing a peer-to-peer network. A data cost classification is determined for a plurality of peers. A query list of peers is built for a current peer by adding information about peers of the plurality to query to the query list based on the data cost classification of each of the peers of the plurality. Additionally, the query list is provided to the current peer.

Embodiments provide other methods, computer readable media, and devices involved in providing a peer-to-peer network. A power classification is determined for a plurality of peers. A query list of peers is built for a current peer by adding information about peers of the plurality to query to the query list based on a power classification of each of the peers of the plurality. The query list is provided to the current peer.

Embodiments provide other methods, computer readable media, and devices involved in providing a peer-to-peer network. A network access identifier is received that was previously submitted by the peer to obtain access to an underlying data network. A request is received from the current peer to join the peer-to-peer network. From a look-up of the received network access identifier, it is determined whether the current peer is authorized to access the peer-to-peer network. Access is granted by providing a query list of peers to query when the current peer is authorized.

Embodiments provide other methods, computer readable media, and devices involved in providing a peer-to-peer network. A network access identifier previously submitted by the peer to obtain access to an underlying data network is received. A request is received from the current peer to join the peer-to-peer network. A characteristic of the current peer is determined from a look-up of the received network access identifier. The characteristic is used to determine whether to include the current peer on a query list to provide to another peer.

Embodiments provide still other methods, computer readable media, and devices involved in providing a peer-to-peer network. An operational criteria is determined for a current peer. A query list of peers is built for the current peer by adding information about peers of the plurality to query to the query list based on the operational criteria of the current peer. The query list is provided to the current peer.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

DETAILED DESCRIPTION

Embodiments provide for a peer selection process that may account for characteristics of one or more peers when creating a peer query list to define a cluster for a peer. The characteristics may include operational criteria such as the cost of data transfer of a given peer, the power status of a given peer, the available bandwidth of a given peer, and so forth. The characteristics to consider may be those of the peer being added to a query list and/or those of the peer being provided with the query list. Embodiments further provide for access control to a P2P network based upon credentials such as network access identifiers (IDs) that are used to gain access to the underlying data network. Embodiments additionally provide for tracking of operational criteria of the peer devices by association to credentials of the peer such as the network access ID.

Figure 1A:
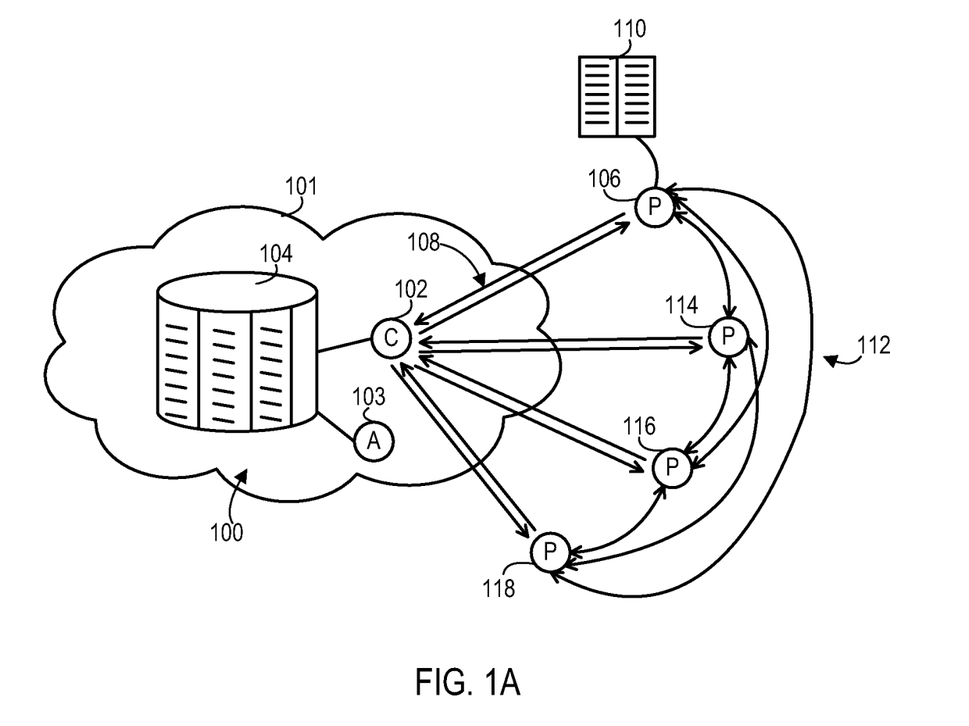
FIG. 1A shows an example of a P2P network operating environment according to various embodiments.

FIG. 1A shows one example of an operating environment of a P2P network 100. Here, an underlying data network 101 is present and provides for data transfer between individual network nodes. The data network 101 may represent a private network or a public network such as the Internet. Furthermore, the data network 101 may represent various network configurations. For instance, the data network 101 may represent a network established and maintained by a particular service provider or may represent a collection of individual networks, where each individual network is established and maintained by a particular service provider.

Within the underlying data network 101, there may be nodes of various types. For purposes of the present discussion, the nodes include a P2P control node 102, an access node 103, and peer nodes or peers 106, 114, 116, and 118. A single control node 102, a single access node 103, and four peers 106, 114, 116, and 118 are shown for purposes of example, and it will be appreciated that the data network 101 may contain any number of such nodes. Furthermore, it will be appreciated that some nodes may function as multiple types of nodes, such as a single node that provides functions of the control node 102, functions of the access node 103, and/or functions of the peer node 106.

The access node 103 may be a gateway or other similar computer device of the data network 101 that receives requests from the peers 106, 114, 116, 118 to gain access to the data network 101. The access node 103 may obtain credentials from the peers 106, 114, 116, 118 referred to herein as network access IDs. The access node 103 checks the network access ID against a database, such as a database 104, that stores the network access IDs that are authorized to gain access to the data network 101 through the access node 103. As an alternative, in some embodiments the access node 103 may monitor ports into the data network 101 that the peers, such as peer 106, are physically connected to and are inherently authorized ports, e.g., particular ports of the access node 103. Any communication over those ports may automatically be considered authorized. In that case, the network access ID provided by the peer, such as peer 106, may be any communication attempt over such an inherently authorized port.

The network access IDs may take one of many forms and may correspond to any of the protocol stack layers. For example, the network access ID may be an international mobile subscriber identity (IMSI) number from a subscriber identity module (SIM) or an international mobile equipment identity (IMEI) number as in the case of a peer, such as the peer 106, that is a global system for mobile communications (GSM) or universal global telecommunication system (UMTS) mobile device. The network access ID may be a mobile equipment identifier (MEID) such as for code division multiple access (CDMA) mobile phones. The network access ID may be a media access control (MAC) number for a wireline network device such as a digital subscriber line (DSL) modem or a cable modem that the peer 106 is using for access or for a network access device of the peer 106 itself. Other examples of network access IDs include Internet Protocol (IP) addresses, physical and/or virtual port identifiers such as a virtual local area network number (VLAN #), device IDs including Common Language Equipment Identifier (CLEI) codes, point-to-point protocol (PPP) username and password combinations, and so forth.

Upon being granted access to the underlying data network 101, a given peer, such as the peer 106, may attempt to join the P2P network which involves requesting eligibility to receive a query list 110 specifying peers to query for content as well as to be added to query lists for other peers and to respond to queries for content from those other peers. The given peer 106 may request entry into the P2P network 100 by sending a request message to the control node 102.

The control node 102, which as discussed above may be a separate node from the access node 103 or may be the same node serving both functions, may also perform an authorization check prior to granting access to the P2P network 100. For example, the P2P network 100 may be a private network that excludes some users who are authorized to use the underlying data network 101. Restrictions on which peer 106 may gain access to the P2P network 100 allows for control of content distribution within the P2P environment.

The control node 102 receives the request message and then compares credentials received in the request message to a database, such as the database 104, to determine if the requesting peer 106 is an authorized peer. The credentials may be of various forms, such as a username and password combination provided through a P2P application implemented by the peer 106. As another example, the credentials may be the network access ID that has already been provided by the peer 106 when gaining access to the underlying data network 101. In that case, the network access ID may be obtained by the control node 102 through the request or in other ways such as by receiving the network access ID from the access node 103 as a result of the initial request to gain data network access.

Upon determining that the peer 106 is authorized, the control node 102 then introduces the peer into the P2P network 100 by defining a cluster for the peer 106 and by including the peer 106 in clusters defined for other peers, such as the peer 114. These communications 108 between the control node 102 and the peer 106 are control communications of the P2P network 100. Upon the peer 106 obtaining the query list 110 that specifies the other peers 114, 116, 118 to poll, the peer 106 then begins participating in content communications 112 among the other peers 114, 116, and 118.

The query list 110, which has been created by the control node 102, specifies those peers that the peer 106 may poll for content. As discussed below, the peer 106 may choose which peer 114, 116, 118 to poll for content at any given time in one of various manners. This query list 110 is created by the control node 102 on the basis of characteristics of the peer 106 receiving the query list 110 and/or the peers 114, 116, and 118 being considered for inclusion on the query list 110. Those characteristics may include operational parameters such as cost of data transfer, power status, and available bandwidth.

These characteristics may be obtained and stored to the database 104 by the control node 102. The characteristics may be obtained either during an initial P2P registration process and/or by a dynamic and ongoing exchange of data between the peers 106, 114, 116, and 118 and the control node 102. For example, a cost of data transfer of the peer 106 may be specified at an initial registration and changed only if the data plan of the peer 106 changes. As another example, a current power status of the peer 106 may be specified at regular intervals so that the control node 102 knows whether the power status of the peer 106 constrains the participation of the peer 106 in the P2P network 100.

The characteristics may be specified as classifications. For operational criteria such as cost, one classification may be that the peer 106 may transfer an unlimited amount of data for a set fee. Another classification for cost may be that a set fee covers transfer up to a pre-defined amount, and additional data transfer costs additional amounts. Another classification for cost may be that any data transfer is charged on a per unit transferred basis. For those peers 106 that have a pay by the unit cost of transfer, the classification may be more detailed, such as to classify the peer 106 based on what the amount of expenditure for a period has been thus far in a period, or to classify as under or over a transfer cap. According to various embodiments, the control node 102 may consider how much data has already been transferred by a given peer, such as the peer 106, in a current period to assign the cost classification at any point in time.

For other operational criteria such as power status, one classification may be utility power while another classification may be battery power. The classification for power may be more detailed as well, particularly for the peers 106 on battery power such as to specify a class for various ranges of power remaining. According to various embodiments, the control node 102 may consider how much power is remaining at a given peer, such as the peer 106, to assign the power classification at any point in time.

Available bandwidth is another example of operational criteria that may be classified. The classification for bandwidth may be as basic as classifying as fast or slow at a given point in time or more detailed such as to specify an available data transfer rate range for a given point in time. The bandwidth classification may be based on a maximum bandwidth available to the peer 106 or may be based on real-time conditions where real-time measurements are taken to reveal the amount of bandwidth available due to factors such as a fluctuating maximum bandwidth and fluctuating usage. According to various embodiments, the control node 102 may consider how much bandwidth is available at a given peer, such as the peer 106, to assign the bandwidth classification at any point in time.

The control node 102 may acquire the information necessary to assign classifications to the operational criteria or other characteristics of the peer 106 in one of various ways. For example, the P2P or other application being implemented by the peer 106 may monitor parameters such as power type, power level, amount of data transfer of a given period, and current bandwidth usage. The peer 106 may then report this information to the control node 102, such as at set intervals or in response to being polled by the control node 102. The control node 102 may monitor some parameters of the peer 106, such as the amount of data transfer and the current bandwidth usage, particularly where the control node 102 is implemented within a gateway providing access to the underlying data network 101 to the peer 106. The control node 102 may also receive such information from one or more other nodes within the data network 101, such as the access node 103, which serves as a gateway for the peer 106 and monitors the amount of data transfer and the current bandwidth usage.

Figure 1B:
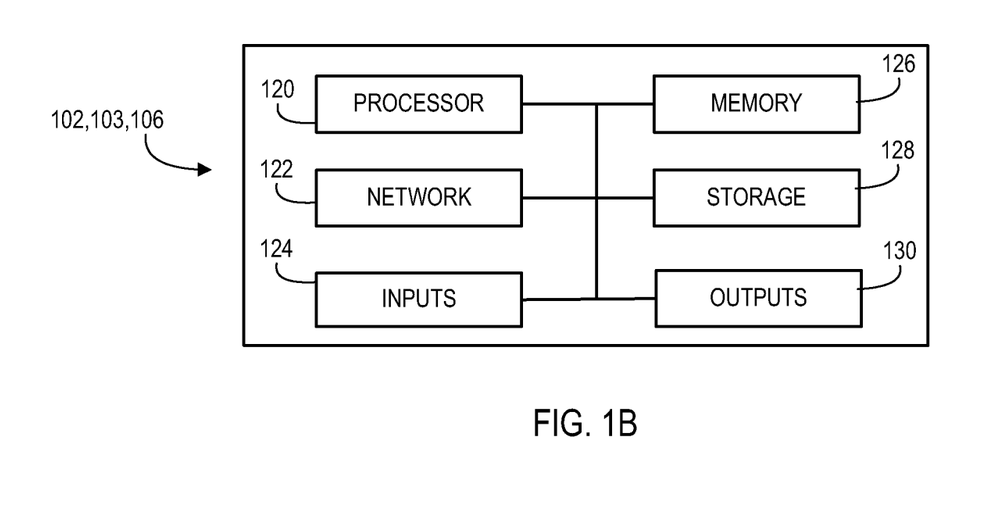
FIG. 1B shows an example of a node of the P2P network operating environment according to various embodiments.

FIG. 1B shows an example of the components that may be present within embodiments of the control node 102, access node 103, or the peers 106, 114, 116, and 118. Each of these nodes may be a conventional computer system, a dedicated purpose device, and/or combinations thereof. The nodes 102, 103, 106, 114, 116, and 118 include a processor 120 that implements instructions to perform logical operations such as those discussed below in reference to FIGS. 2-7. The processor 120 may be of various forms including a general purpose programmable processor, a dedicated purpose processor, hardwired digital logic, or various combinations thereof. The processor 120 may employ a memory 126, which may be volatile, involatile, or combinations thereof, to store programming, reference values, dynamically generated data, and the like.

The processor 120 and the memory 126 are examples of a computer readable media which store instructions that when performed implement various logical operations. Such computer readable media may include various storage media including electronic, magnetic, and optical storage. Computer readable media may also include communications media, such as wired and wireless connections used to transfer the instructions or send and receive other data messages.

The processor 120 communicates with various other components. For example, exemplary embodiments of the nodes 102, 103, 106, 114, 116, and 118 may include a network interface 122 that may provide a wired or wireless connection to the data network 101; a mass storage device 128 such as a magnetic, optical, or electronic storage drive that may provide additional data and programming storage; input devices 124 such as a keyboard and mouse; and output devices 130 such as a video display.

Figure 2:
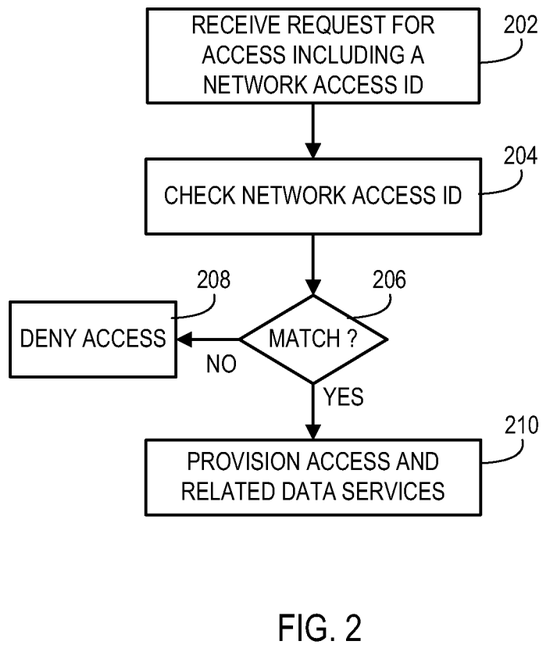
FIG. 2 shows an example of a set of logical operations performed by an access node when granting data network access according to various embodiments.

FIG. 2 shows one example of logical operations that may be performed by an access node, such as the access node 103, to grant or deny access to the underlying data network 101 for the peer 106. Initially, the access node 103 receives a request for access to the data network 101 from the peer 106 at a request operation 202. The request may specify the network access ID of the peer 106. This request may involve various layers of the communication protocol stack, and the network access ID may be provided as a function of the negotiation process between the peer 106 and the access node 103. For example, the MAC address, IMSI, IMEI, MEID, or other such identifier of the peer 106 may be provided and used for the subsequent operations of FIG. 2. The network access ID may be a value from a higher layer in the protocol stack such as a username and password combination for a PPP connection to a DSL or cable modem that provides connectivity from the peer 106 to the access node 103. Furthermore, multiple network access IDs may be involved in the negotiation with the access node 103, such as a MAC address and a username and password combination.

Upon receiving the network access ID for the peer 106, the access node 103 checks the network access ID against a master list of those peers who are authorized to access the data network 101 via the access node 103 at a look-up operation 204. The master list may be created and maintained by service providers who operate the access nodes 103 where a network access ID is added to the master list upon a consumer purchasing data network access through the service provider and being assigned the network access ID.

The access node 103 detects whether the network access ID received in the request matches an entry of the master list at a query operation 206. If the network access ID does not match, this indicates that the peer 106 is not an authorized user of the data network 101 and access is denied at a denial operation 208 by rejecting the request. If the network access ID does match, then the access node 103 provisions access and related data services of the data network 101 to the peer 106 that has submitted the request at an access operation 210.

Figure 3:
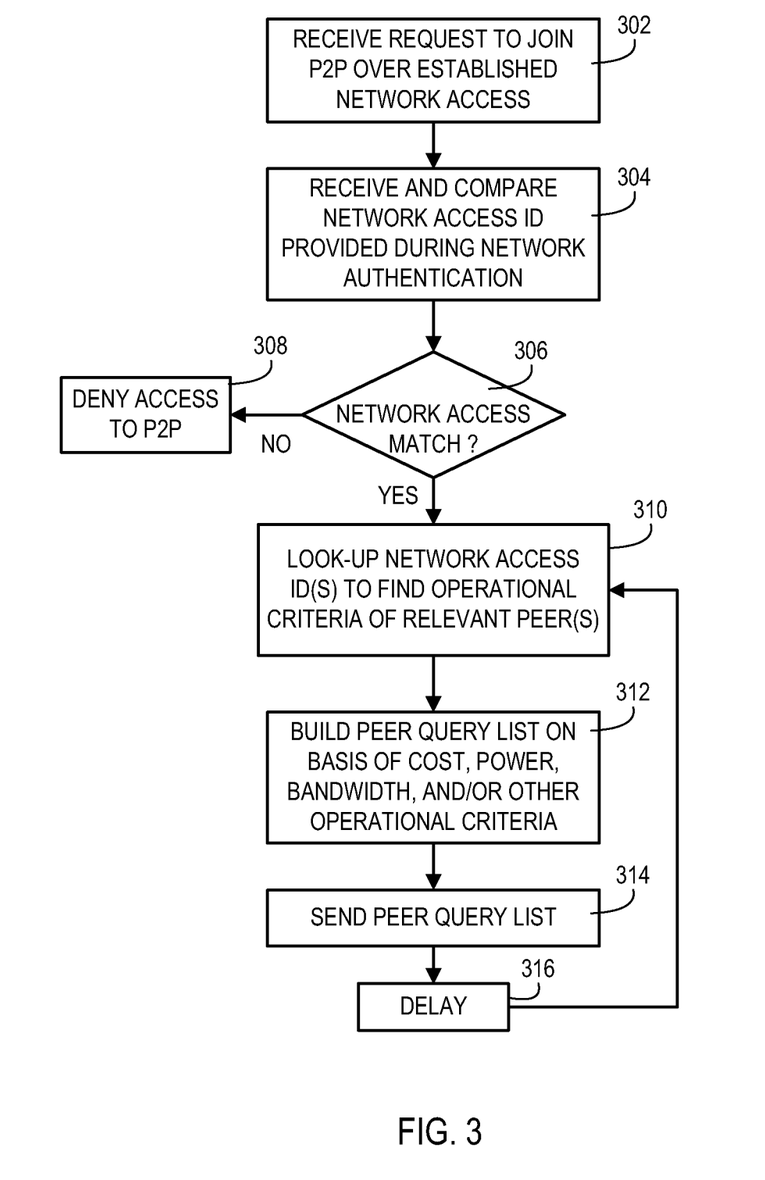
FIG. 3 shows an example of a set of logical operations performed by a control node when granting access to the P2P network according to various embodiments.

FIG. 3 shows an example of logical operations that may be performed by embodiments of the control node 102 or the access node 103 to grant or deny access to the P2P network 100 after the peer 106 has gained access to the underlying data network 101. The control node 102 or access node 103 receives a request to join the P2P network 100 from the peer 106 over an established data network access at a request operation 302. The control node 102 or access node 103 receives the request and compares credentials for the peer 106 to a master list maintained for the P2P network 100 at a look-up operation 304.

As discussed above, these credentials may be the network access ID that has been previously provided to the access node 103 when the peer 106 was requesting access to the underlying data network 101. According to one or more exemplary embodiments, the network access ID may be provided from the peer 106 again by the P2P application of the peer 106 collecting and submitting this information. According to one or more other exemplary embodiments, the control node 102 may obtain the network access ID for the peer 106 from elsewhere, such as from the access node 103 that has already received the network access ID for the peer 106. As an alternative, the access node 103 may review the credentials that have already been received for purposes of data network 101 access to also determine whether the peer has authorization to reach the control node 102 and hence the P2P network 100. If the peer, such as peer 106, is unauthorized to access the P2P network 100 then the access node 103 discards any attempts to reach the control node 102 by that peer.

In either the instance where the control node 102 or the access node 103 acts as the gatekeeper to the P2P network 100, the control node 102 may further utilize the network access ID for additional P2P network 100 gatekeeping. For example, the control node 102 may utilize the network access ID to determine whether a particular peer, such as peer 106, has authorization to enter into sub-portions or other groupings of the P2P network 100 that are restricted due to the content that is available within the sub-P2P portion or due to membership restriction.

The control node 102 or access node 103 detects at a query operation 306 whether the received network access ID for the peer 106 matches the master list for the P2P network 100. If not, then the control node 102 denies access to the P2P network 100 at a denial operation 308 by rejecting the request, or in the case of the access node 103, attempts to reach the control node 102 are discarded. If the network access ID does match, then the control node 102 grants access by proceeding to build the query list 110 for the current peer 106 and to include the current peer 106 on query lists for other peers if and when appropriate. Where the access node 103 is the gatekeeper to the P2P network 100, when the ID does match then the access node allows the requests to join the P2P network 100 to reach the control node 102 such that the control node 102 may then proceed with building the query list 110.

The control node 102 begins the process of building the query list 110 for the current peer 106, as well as building query lists for other peers that may include the current peer 106, by looking-up the network access IDs in the database 104 at a look-up operation 310. In some embodiments, the control node 102 may look-up the network access ID of peers relevant to the current peer 106, such as those peers 114, 116, and 118 that contain content relevant to the current peer 106. The request to join the P2P network 100 may specify the content relevant to the current peer 106 or the specification of content may be stored in association with the network access ID of the current peer 106.

In some embodiments, the control node 102 may look-up the network access ID of the current peer 106 at this point to find characteristics of the peer 106 including operational criteria. For instance, the characteristics including operational criteria of the current peer 106 may dictate which peers 114, 116, 118 may be added to the query list 110 being prepared for the current peer 106. This operational criteria of the current peer 106 may also be looked-up where the operational criteria dictates to which query lists of other peers the current peer 106 will be added.

Upon finding the stored characteristics of the peers 106, 114, 116, and 118 that may be relevant to building the query lists, the control node 102 then builds the query list 110 to be provided to the peer 106. The control node 102 builds the query list 110 by selecting other peers 114, 116, and 118 to add to the query list 110 on the basis of the operational criteria such as the cost of data transfer, the power status, and/or the available bandwidth at a list operation 312. These considerations of operational criteria may be made in addition to any conventional P2P considerations such as availability of content among the peers 114, 116, and 118.

After building the query list 110, the control node 102 then provides that query list 110 to the peer 106 at a send operation 314. At this point, the peer 106 has the ability to begin polling those peers 114, 116, and 118 on the query list 110 and to begin receiving content available from those peers. Furthermore, the peer 106 may have been added to a query list sent to another peer 114, 116, or 118 such that the peer 106 may begin to receive requests for content from these other peers 114, 116, or 118 at this point.

In some embodiments, the control node 102 may terminate its interaction with the peer 106 at this point and allow the peer 106 to participate within the P2P network 100 without further communication with the control node 102. In other embodiments, the control node 102 may maintain periodic communications with the peer 106 to receive updates of operational criteria that the peer 106 may collect and report and/or to provide the peer 106 with an updated query list 110.

After sending the query list 110 for a given iteration, the control node 102 may delay any query list updates at a delay operation 316. During this delay the control node 102 may poll for or otherwise receive updated operational criteria for the peer 106 as well as the other peers 114, 116, and 118. The control node 102 may store this updated information in association with the identifier of each reporting node 106, 114, 116, and 118. The control node 102 may also detect that one or more nodes 106, 114, 116, and 118 have terminated their participation in the P2P network 100. After this delay, the control node 102 may again look-up the network access identifier of a peer 106, 114, 116, or 118 of interest at the look-up operation 310. The control node 102 then proceeds to build an updated query list 110 for each peer 106, 114, 116, and 118 remaining in the P2P network 100.

Figure 4:
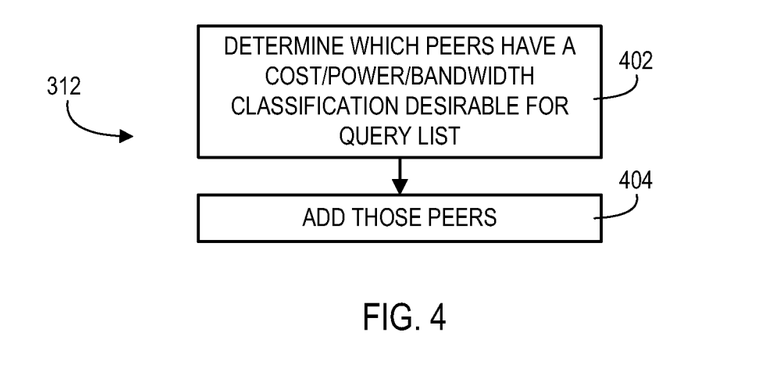
FIG. 4 shows a first example of a subset of logical operations performed by a control node when selecting peers for a query list according to various embodiments.
Figure 5:
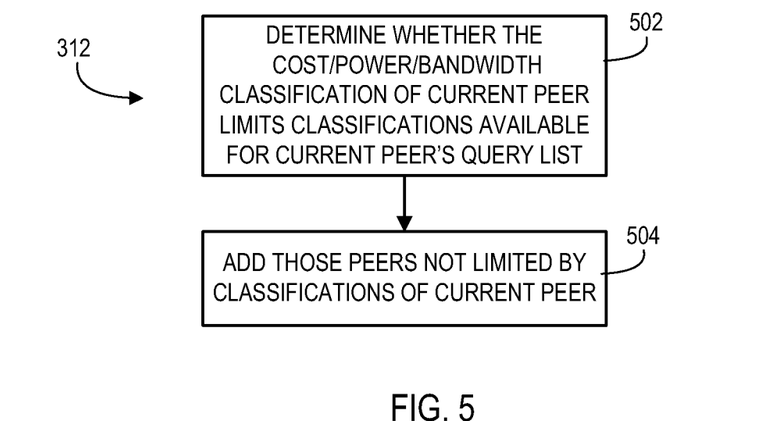
FIG. 5 shows a second example of a subset of logical operations performed by a control node when selecting peers for a query list according to various embodiments.
Figure 6:
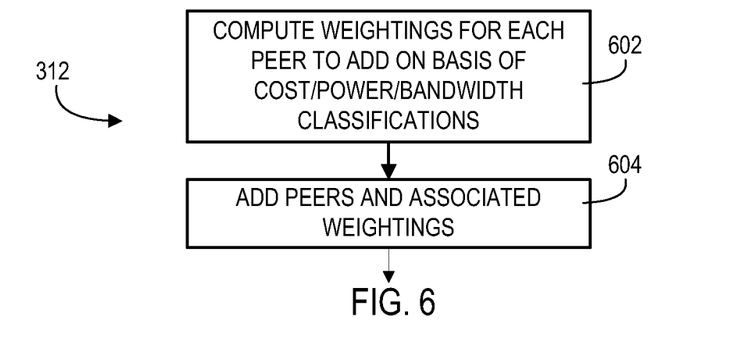
FIG. 6 shows a third example of a subset of logical operations performed by a control node when selecting peers for a query list according to various embodiments.

FIGS. 4-6 illustrate examples of sub-operations of the list operation 312 of FIG. 3 that the control node 102 may perform to build the query list 110 for the peer 106. In these operations, the control node 102 takes into account at least one operational criteria of the peer 106 that will receive the query list 110 and/or at least one operational criteria of the other peers 114, 116, and 118 that are subject to inclusion on the query list 110. These sets of logical operations are provided as examples that may be implemented alone or in combination with those of the other FIGS. 4-6.

Referring to FIG. 4, here the control node 102 is interested in determining which peers 114, 116, and 118 should be included on the query list 110 for the peer 106 based on the operational criteria of those peers 114, 116, and 118 to be added to the list. At a criteria operation 402, the control node 102 makes a determination as to which peers 114, 116, and 118 have one or more operational criteria that are desirable for a peer being queried by the peer 106. For example, cost, power, or bandwidth may individually or collectively be of concern.

As one specific scenario, cost may be of concern and the peer 114 may be classified as having a cost of data transfer that applies a charge for every unit of data transferred, such as is often the case for mobile phone data devices. The peer 116 may be classified as having a cost of data transfer that applies a charge for every unit of data transferred once a cap is reached but the cap has yet to be reached. The peer 118 may be classified as having a cost of data transfer where a set price provides for unlimited data transfers so that no additional costs will accrue. In that case, the control node 102 may decide that the peer 114 should not be queried by the peer 106 due to the cost burden that will result for the peer 114 sourcing content to the peer 106, where that cost would otherwise be absorbed by the peer 114 or aggregated and split among the peers 106, 114, 116, and 118 as part of a file sharing service charge. However, the control node 102 may decide that at the present time, the peer 116 may be added to the query list 110 considering that the cap for data transfer has not yet been reached. Furthermore, the control node 102 may decide that the peer 118 can be added without further consideration to cost.

As another specific scenario, power may be of concern and the peer 114 may be classified as having a power status that is a battery source having less than a 50% charge. The peer 116 may have a power status that is a battery source having greater than a 50% charge. The peer 118 may have a power status that is a utility power source and thus does not decrease in power capacity. In that case, the control node 102 may decide that the peer 114 should not be queried by the peer 106 due to the power burden and the likelihood of the peer 114 reaching a critical power state. However, the control node 102 may decide that at the present time, the peer 116 may be added to the query list 110 considering that the peer 116 has an adequate amount of battery power available. Furthermore, the control node 102 may decide that the peer 118 can be added without further consideration to power.

As another specific scenario, bandwidth may be of concern and the peer 114 may be classified as having a perpetually slow transfer rate. The peer 116 may be classified as having a fluctuating but currently fast transfer rate. The peer 118 may be classified as having a perpetually fast transfer rate. In that case, the control node 102 may decide that the peer 114 should not be queried by the peer 106 due to the lengthy time to transfer content. However, the control node 102 may decide that at the present time, the peer 116 may be added to the query list 110 considering that the peer 116 currently has acceptable bandwidth availability. Furthermore, the control node 102 may decide that the peer 118 can be added without further consideration to bandwidth.

In each of the scenarios above, upon the control node 102 concluding that it is acceptable for the peer 106 to poll certain peers 116 and 118 for content, the control node 102 then adds those peers 116 and 118 to the query list 110 while omitting the peer 114 from the query list 110 at a list operation 404.

Another example of a scenario involves combining the three previous scenarios. In that case, embodiments of the control node 102 find numerous reasons to exclude the peer 114 from the query list 110. The embodiments of the control node 102 find no reason to exclude the peer 118 from the query list 110. Regarding the peer 116, one or more embodiments of the control node 102 may decide that because all three criteria are currently acceptable that the peer 116 may be added to the query list 110. Alternatively, the control node 102 may determine that because the peer 116 has multiple operational criteria that are potentially problematic, the likelihood of the peer 116 experiencing a problem while attempting to source content to the peer 106 is too great. In that case, the embodiments of the control node 102 may exclude the peer 116 from the query list 110.

Referring to FIG. 5, here the control node 102 is interested in determining which peers 114, 116, and 118 should be included on the query list 110 for the peer 106 based on the operational criteria of the peer 106 that will receive and act on the query list 110. At a criteria operation 502, the control node 102 makes a determination as to whether the peer 106 has one or more operational criteria that present a conflict with polling other peers 114, 116, and 118. For example, cost, power, or bandwidth of the peer 106 may individually or collectively be of concern without regard to the operational criteria of the other peers 114, 116, and 118. Furthermore, the operational criteria of the peer 106 may be of concern specifically in relation to the operational criteria of the other peers 114, 116, and 118.

As one specific scenario, cost may be of concern and the peer 106 may be classified as having a cost of data transfer that will result in charges being levied against the peer 106 for data transfer. In that case, those other peers 114, 116, and 118 having data intensive content, such as high resolution video or high fidelity audio may be avoided as the content coming from those sources would have a larger amount of data to be received by the peer 106. Peers with less data intensive versions of the content may be chosen for the query list 110 instead. In such an example, the data intensity may be measured by proxies such as file size or volume of data transmitted.

As another specific scenario, power may be of concern and the peer 106 may be classified as having a power status that will result in the peer 106 reaching a critical power level such as a very low battery if the peer 106 communicates over a lengthy period of time. In that case, those other peers 114, 116, and 118 having a slow uplink may be excluded so that the content may be delivered to the peer 106 more quickly to reduce the likelihood that the peer 106 will reach a critical state before content delivery has completed. Other scenarios where power may be of concern include frequent content or other relevant data updates such presence, location or telemetry information, requiring updates often, even though the amount of data transferred each time might be very small.

As another specific scenario, the bandwidth may be of concern and the peer 106 may be classified as having a perpetually slow downlink to the data network 101. In that case, those other peers 114, 116, and 118 having data intensive content may be avoided as the content coming from those sources may take an unacceptably long time to be received by the peer 106 and in the case of streaming, may result in an unacceptable rate of playback of the content.

In each of the scenarios above, upon the control node 102 concluding that it is acceptable for the peer 106 to poll certain peers 114, 116, and 118 for content, the control node 102 then adds those acceptable peers 114, 116, and 118 to the query list 110 while omitting any of those unacceptable peers 114, 116, and 118 from the query list 110 at a list operation 504.

The scenarios discussed above in relation to FIG. 4 may be combined with those in the discussion above for FIG. 5. In that case, the control node 102 considers both the operational criteria of the peer 106 that will receive the query list 110 as well as the same operational criteria of the other peers 114, 116, and 118 that may be added to the query list 110.

For example, the control node 102 may apply a rule where a given peer may only poll and/or only be polled by those peers sharing the same classification for cost, power, and/or bandwidth. For instance, all those peers being classified as having a high cost of data may poll and be polled by each other while those peers being classified as having no added cost of data transfer may poll and be polled by each other.

As another example, the control node 102 may apply a rule where a given peer may only poll and/or only be polled by those peers that do not share the same classification for cost, power, and/or bandwidth. For instance, all those peers having a battery power status may only poll those other peers having a utility power status while those peers having utility power status may not poll those peers having a battery power status.

Referring to FIG. 6, here the control node 102 is interested in assigning weightings to the peers 114, 116, and 118 being included on the query list 110 for the peer 106 based on the operational criteria of the peer 106 and/or the operational criteria of each of the peers 114, 116, and 118. At a criteria operation 602, the control node 102 makes a determination as to the operational criteria of the peers 106, 114, 116, and 118 and computes the weightings based on the relative operational criteria among the group of peers 106, 114, 116, and 118. Thus, the operational criteria of each of the peers 114, 116, and 118 plays a role in computing the weightings to be applied to those peers 114, 116, and 118 for the query list 110 of the peer 106.

As one specific scenario, cost may be a factor of concern. The peer 114 may be classified as having a cost for any data transfer. The peer 116 may be classified as having a cost only once a cap that is yet to be reached is exceeded. The peer 118 may be classified as having no additional cost for any amount of transfer. In that case, the peer 114 may be assigned a very low weighting or even zero, while the peer 116 is assigned a higher weighting and the peer 118 is assigned the highest weighting. The weightings of this example may be normalized to add up to 1, where the peer 114 is assigned 0.0, the peer 116 is assigned 0.2, and the peer 118 is assigned 0.8. In that case, the weightings provide that the peer 114 will not be polled so that the peer 114 transfers no amount of data while the peer 118 will be polled four times as often as the peer 116 and transfer several times more data than that of the peer 116.

One will appreciate that there are similar scenarios involving power or bandwidth where the weighting specifies the percentage of times within a period that a given peer will be polled for content by the peer 106. One will further appreciate that the operations of FIG. 4 and/or FIG. 5 may be implemented in conjunction with those of FIG. 6 so as to eliminate some of the peers 114, 116, and 118 prior to weighting the remaining ones for the query list 110 of the peer 106. In each of these scenarios for FIG. 6, upon the control node 102 computing the weightings for each of the peers 114, 116, and 118 to be polled by the peer 106, the control node 102 then adds those peers 114, 116, and 118 and the associated weightings to the query list 110 at a list operation 604.

Figure 7:
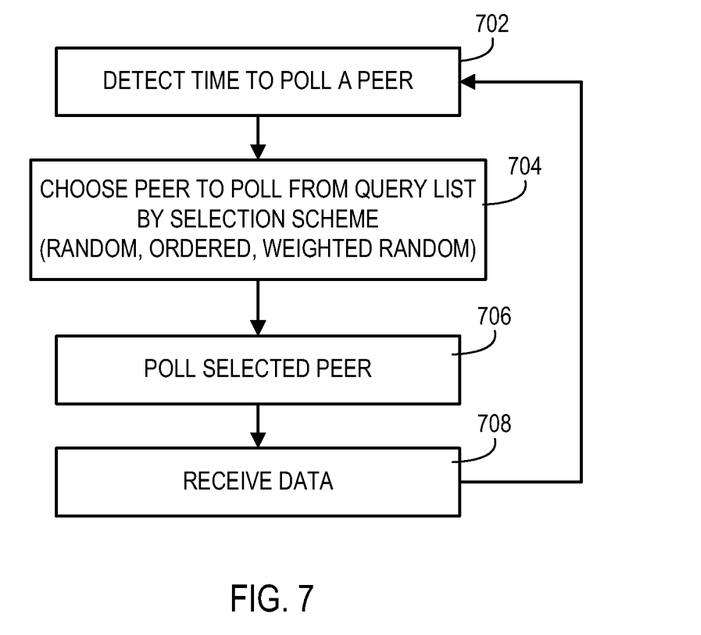
FIG. 7 shows an example of a set of local operations performed by a peer when attempting to poll other peers for content according to various embodiments.

FIG. 7 shows an example of logical operations performed by the peer 106 after having received the query list 110 that has been provided by the control node 102. The peer 106 detects that a time to poll the peer 114, 116, or 118 for content has occurred at a detection operation 702. The peer 106 then chooses the particular peer 114, 116, or 118 to poll from the query list 110 by a selection scheme being implemented by the P2P application of the peer 106 at a selection operation 704. The selection scheme may be a random selection from the list, an ordered selection, a weighted random selection, weighted ordered selection, and so forth where the weighting, if any, has been specified by the control node 102 on the basis of the operational criteria that has been considered.

The peer 106 polls the other peer 114, 116, or 118 that has been selected from the query list 110 at a polling operation 706. The peer 106 then receives data that has been sent from the polled peer 114, 116, or 118 in response to the polling by the peer 106 at a reception operation 708. The peer 106 then begins to again detect the next time to poll one of the peers 114, 116, or 118.

Figure 8:
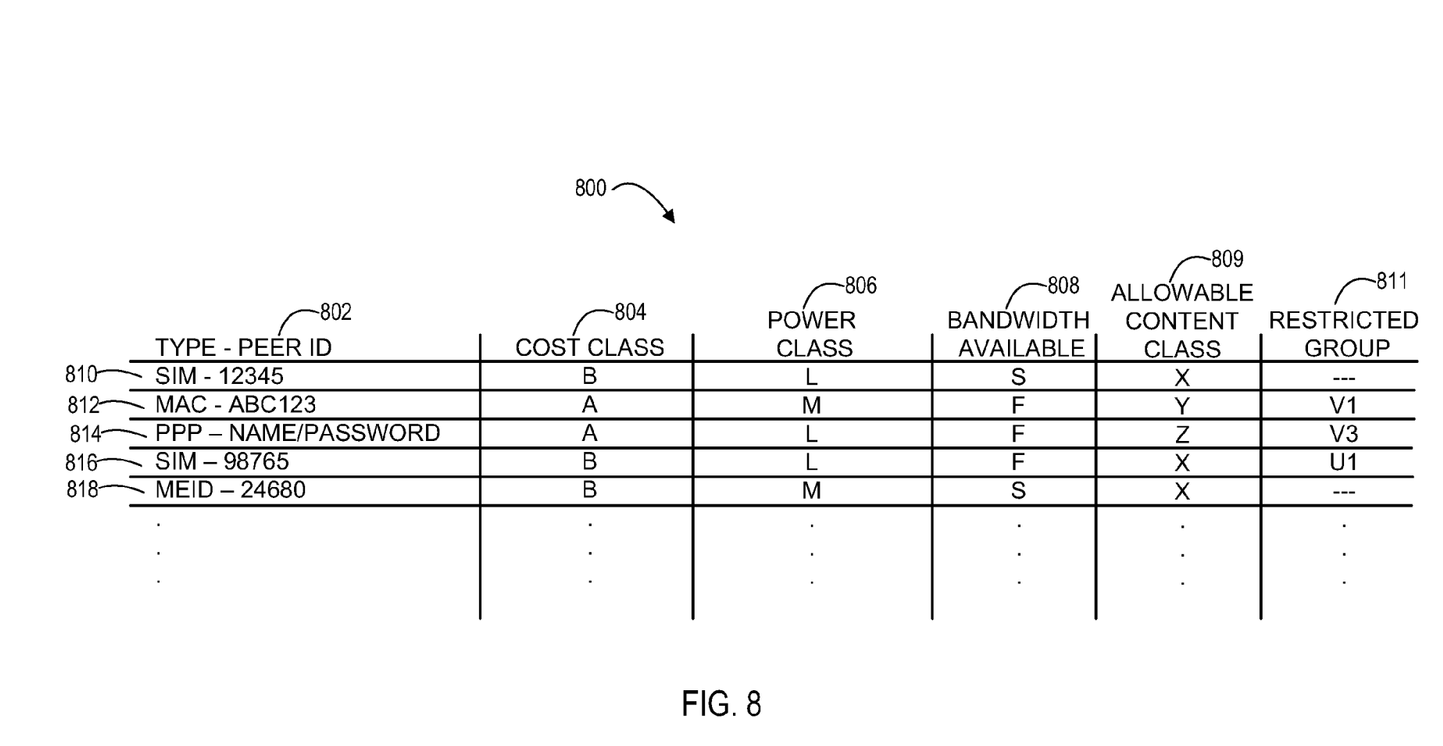
FIG. 8 shows an example of a database storing associations of network access identifiers of authorized peers to operational criteria.

FIG. 8 shows one example of a database configuration 800 for maintaining the network access ID or other credential that provides access to the P2P network 100 as well as to restricted content and/or restricted groupings of the P2P network 100. The database configuration 800 also maintains the various operational criteria associated to the network access ID or other credential for a given peer, such as the peer 106.

In the example shown, the database configuration 800 includes a first column 802 that specifies the network access ID or other credential being used to gain access to the P2P network 100. A second column 804 specifies the cost classification, a third column 806 specifies a power classification, and a fourth column 808 specifies a bandwidth classification. A fifth column 809 specifies the class(es) of content that are available to a particular peer while a sixth column 811 specifies the restricted membership group(s) that are available to a particular peer.

Each row represents a particular peer. A row 810 specifies an IMSI network access ID from a SIM. This row 810 specifies that this peer has a cost class B which indicates that data transfer is an additional charge. This row 810 specifies that this peer has a power class L which indicates that there is battery power. This row 810 further specifies that this peer has a bandwidth class S which indicates that there is a relatively slow data connection. The row 810 also specifies that this peer can access content of class X but cannot access any restricted membership groupings of peers of the P2P network 100. Regarding the content class X, this class may indicate that this peer has access to all the available content within the P2P network 100.

A row 812 specifies a MAC address network access ID. This row 812 specifies that this peer has a cost class A which indicates that data transfer is at no additional charge. This row 812 specifies that this peer has a power class M which indicates that there is power from the main utility source. This row 812 further specifies that this peer has a bandwidth class F which indicates that there is a relatively fast data connection. The row 812 also specifies that this peer can access content of class Y and can access restricted membership group VI of the P2P network 100. Regarding the content class Y, this class may be of a particular type of content, such as content having a certain rating or content of a certain type such as audio only. Regarding the restricted membership group VI, this may indicate that this peer has access to a first virtual private of the P2P network 100.

The network access IDs, cost classifications, power classifications, bandwidth classifications, allowable content classifications, and restricted memberships are further provided for other peers corresponding to rows 814, 816, and 818. As can been seen, this collection of peers provides for various combinations of the network access IDs and the operational criteria classifications. While the operational criteria are shown as having two different classifications, it will be appreciated that any number of classes may be defined for the operational criteria.

As can be seen from the discussion above, the P2P networks 100 are provided by considering characteristics of the peers including operational criteria when defining clusters of peers to poll for a given peer. As can be further seen, access to the P2P networks 100 may be based on credentials such as the network access ID that has been used to gain access to the underlying data network and the operational criteria may be stored and accessed in relation to such credentials. While embodiments have been particularly shown and described, it will be understood by those skilled in the art that various other changes in the form and details may be made therein without departing from the spirit and scope of the invention.

What is claimed is:

1. A method of providing a peer-to-peer network, comprising:
   determining, at a control node, a data cost classification for a plurality of peers;
   building, at the control node, a query list of peers for a current peer by adding information about peers of the plurality for the current peer to query to the query list based on the data cost classification of each of the peers of the plurality, wherein adding information about peers of the plurality to query to the query list comprises choosing which of the peers to add to the query list based on the data cost classification of each of the peers, wherein choosing the peers to place on the query list is further based on the data cost classification of the current peer;
   receiving, at the control node, a request from the current peer to join the peer-to-peer network, wherein the control node then determines the data cost classification for the current peer by performing a look-up of an identifier provided by the current peer within a database specifying the data cost classification associated with the identifier provided by the current peer, wherein the data cost classification of the current peer is provided to the database upon registration of the current peer with the control node device or the data cost classification of the current peer is dynamically provided to the database as a data plan of the current peer changes; and
   providing, by the control node, the query list to the current peer for selecting peers to query.

2. The method of claim 1, wherein adding information about peers of the plurality to query to the query list comprises applying a selection weighting to the peers being added to the list where the weighting is based on the data cost classification of each of the peers.

3. The method of claim 1, wherein the current peer has a first data cost classification and wherein choosing the peers to place on the query list comprises choosing only those peers having the first data cost classification.

4. The method of claim 1, wherein the identifier is a network access identifier used to provision underlying data network access to the peer, the method further comprising performing a look-up within an access database of the network access identifier to grant the current peer with access to the underlying data network, and after granting access the control node looks up the network access identifier in a database to determine the cost classification of the current peer.

5. The method of claim 4, further comprising determining whether to grant access to the peer-to-peer network for the current peer when looking up the network access identifier after granting access to the underlying data network.

6. The method of claim 1, wherein the data cost classification of the current peer is one of no additional charge for any amount of data transfer, an additional charge for data transfer over a specified amount, and an additional charge per specified unit of data transferred.

7. The method of claim 1, wherein building a query list of peers for the current peer further comprises adding information about peers of the plurality to query to the query list based on a power classification of each of the peers of the plurality.

8. A control node device for providing a peer-to-peer network, comprising:
   a processor; and
   a memory storing instructions which, when executed by the processor, cause the processor to:
     determine a data cost classification for a plurality of peers;
     build a query list of peers for a current peer to query by adding information about peers of the plurality to query to the query list based on a data cost classification of each of the peers of the plurality, wherein adding information about peers of the plurality to query to the query list comprises choosing which of the peers to add to the query list based on the data cost classification of each of the peers, wherein choosing the peers to place on the query list is further based on the data cost classification of the current peer;
     receive a request from the current peer to join the peer-to-peer network;
     determine the data cost classification for the current peer by performing a look-up of an identifier provided by the current peer within a database specifying the data cost classification associated with the identifier provided by the current peer, wherein the data cost classification of the current peer is provided to the database upon registration of the current peer with the control node or the data cost classification of the current peer is dynamically provided to the database as a data plan of the current peer changes; and
     provide the query list to the current peer for selecting peers to query.

9. The control node device of claim 8, wherein adding information about peers of the plurality to query to the query list comprises applying a selection weighting to the peers being added to the list where the weighting is based on the power classification of each of the peers.

10. The control node device of claim 8, wherein adding information about peers of the plurality to query to the query list comprises choosing which of the peers to add to the query list based on the power classification of each of the peers.

11. The control node device of claim 10, wherein choosing the peers to place on the query list is further based on the power classification of the current peer.

12. A non-transitory computer readable storage medium containing instructions that relate to providing a peer-to-peer network that when executed by a processor within a control node cause the processor to perform acts comprising:
   determining operational criteria including data cost classification for a plurality of peers;
   building a query list of peers for a current peer by adding information about peers of the plurality for the current peer to query to the query list based on the data cost classification of each of the peers of the plurality, wherein adding information about peers of the plurality to query to the query list comprises choosing which of the peers to add to the query list based on the data cost classification of each of the peers, wherein choosing the peers to place on the query list is further based on the data cost classification of the current peer;

receiving a request from the current peer to join the peer-to-peer network and determining the data cost classification for the current peer by performing a look-up of an identifier provided by the current peer within a database specifying the data cost classification associated with the identifier provided by the current peer, wherein the data cost classification of the current peer is provided to the database upon registration of the current peer with the control node or the data cost classification of the current peer is dynamically provided to the database as a data plan of the current peer changes; and providing the query list to the current peer for selecting peers to query.

13. The non-transitory computer readable storage medium of claim 12, wherein the operational criteria for the plurality of peers further comprise at least one of power and available bandwidth.

14. The non-transitory computer readable storage medium of claim 12, wherein adding information about peers of the plurality to query to the query list is further based on the operational criteria of the current peer.

15. The control node device of claim 8, wherein adding information about peers of the plurality to query to the query list comprises applying a selection weighting to the peers being added to the list where the weighting is based on the data cost classification of each of the peers.

16. The control node device of claim 8, wherein the current peer has a first data cost classification and wherein choosing the peers to place on the query list comprises choosing only those peers having the first data cost classification.

17. The non-transitory computer readable storage medium of claim 12, wherein adding information about peers of the plurality to query to the query list comprises applying a selection weighting to the peers being added to the list where the weighting is based on the data cost classification of each of the peers.

18. The non-transitory computer readable storage medium of claim 12, wherein the current peer has a first data cost classification and wherein choosing the peers to place on the query list comprises choosing only those peers having the first data cost classification.

* * * * *